US012003992B2

(12) United States Patent
Seeber (10) Patent No.: US 12,003,992 B2
(45) Date of Patent: *Jun. 4, 2024

(54) PASSIVE DETERMINATION OF PAIRING AND CHANNEL PARAMETERS FOR SHORT-RANGE WIRELESS COMMUNICATIONS

(71) Applicant: Bastille Networks, Inc., Atlanta, GA (US)

(72) Inventor: Sebastian Balint Seeber, San Francisco, CA (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,995

(22) Filed: May 18, 2023

(65) Prior Publication Data

US 2023/0292162 A1 Sep. 14, 2023

Related U.S. Application Data

(63) Continuation of application No. 17/453,909, filed on Nov. 8, 2021, now Pat. No. 11,696,160, which is a
(Continued)

(51) Int. Cl.
*H04W 24/08* (2009.01)
*H04L 43/12* (2022.01)
(Continued)

(52) U.S. Cl.
CPC ............ *H04W 24/08* (2013.01); *H04L 43/12* (2013.01); *H04W 4/80* (2018.02); *H04W 12/037* (2021.01);
(Continued)

(58) Field of Classification Search
CPC ..... H04W 24/08; H04W 4/80; H04W 12/037; H04W 12/121; H04W 64/00;
(Continued)

(56) References Cited

U.S. PATENT DOCUMENTS 11,202,216 B2 * 12/2021 Seeber ................ H04W 12/121
11,696,160 B2 * 7/2023 Seeber ................ H04W 12/037
370/254

(Continued)

*Primary Examiner* — Abdullahi Ahmed
(74) *Attorney, Agent, or Firm* — Eversheds Sutherland US) LLP (57) ABSTRACT

Systems and methods can support identifying pairings and channel parameters in short-range wireless communications such as Bluetooth low energy interfaces. Radio frequency sensors may be positioned within an electromagnetic environment where a master wireless device and a slave wireless device share short-range wireless communications. Signals transmitted between the master wireless device and the slave wireless device can be received by the radio frequency sensors. Inter-arrival times for packets within the received signals may be identified. Statistics of the inter-arrival times can be analyzed to identify connection intervals between the master wireless device and the slave wireless device, as well as back-to-back intervals exchanged within the connection intervals. Packet header contents may be used to reconcile the estimated timing parameters and time slots. Pairings between the master wireless device and the slave wireless device may be identified and tracked along with communication channel parameters.

20 Claims, 5 Drawing Sheets

Related U.S. Application Data continuation of application No. 16/785,644, filed on Feb. 9, 2020, now Pat. No. 11,202,216.

(51) Int. Cl.
*H04W 4/80* (2018.01)
*H04W 12/037* (2021.01)
*H04W 12/121* (2021.01)
*H04W 64/00* (2009.01)
*H04W 84/20* (2009.01)
*H04W 92/18* (2009.01)

(52) U.S. Cl.
CPC ......... *H04W 12/121* (2021.01); *H04W 64/00* (2013.01); *H04W 84/20* (2013.01); *H04W 92/18* (2013.01)

(58) Field of Classification Search
CPC ..... H04W 84/20; H04W 92/18; H04W 8/005; H04W 16/18; H04W 12/50; H04W 24/04; H04L 43/12
See application file for complete search history.

(56) References Cited

U.S. PATENT DOCUMENTS

| | | | |
|---|---|---|---|
| 2008/0045235 A1* | 2/2008 | Kennedy | G01S 5/02521 455/456.1 |
| 2013/0034070 A1* | 2/2013 | Seo | H04L 5/0032 370/329 |
| 2017/0019903 A1* | 1/2017 | Talukdar | H04W 28/16 |
| 2017/0195152 A1* | 7/2017 | Chu | H04L 27/22 |
| 2017/0353365 A1* | 12/2017 | Li | H04L 43/04 |
| 2019/0208449 A1* | 7/2019 | Wang | H04W 4/40 |

* cited by examiner

PASSIVE DETERMINATION OF PAIRING AND CHANNEL PARAMETERS FOR SHORT-RANGE WIRELESS COMMUNICATIONS

CROSS-REFERENCE TO RELATED APPLICATIONS

This application is a continuation of U.S. application Ser. No. 17/453,909 filed Nov. 8, 2021, which is a continuation of U.S. application Ser. No. 16/785,644, filed Feb. 9, 2020, the disclosure of which is incorporated herein by reference in their entireties.

BACKGROUND

Short-range wireless data technologies are increasingly used to replace cables or wired interconnects between computers, peripherals, tablets, smartphones, stereos, and other electronic devices. Examples of short-range wireless technologies include Bluetooth, Wireless USB, Z-Wave, ZigBee, and other personal area network (PAN) solutions.

In certain short-range wireless technologies, such as classic Bluetooth, devices are paired to share a data connection. From the pairing, one or more low-level addresses, such as MAC addresses, are exposed in the transmitted packets. In more advanced, or more secure, short-range wireless technologies, such as Bluetooth Low Energy (BLE), devices are associated but there may be no persisted identifier or low-level information that is continuously exposed in the transmitted packets. This can complicate third-party analysis of the short-range wireless communication channel.

There is a need in the art for passive determination of pairing and channel parameters for short-range wireless communications to enable analysis, localization, and characterization of associated communication channels. Such information further enables securing communications and information operations within a wireless environment at an enterprise or campus level.

SUMMARY

In certain example embodiments described herein, methods and systems can support identifying pairings and channel parameters in short-range wireless communications such as Bluetooth low energy interfaces. Radio frequency sensors may be positioned within an electromagnetic environment where a master wireless device and a slave wireless device share short-range wireless communications. Signals transmitted between the master wireless device and the slave wireless device can be received by the radio frequency sensors. Inter-arrival times for packets within the received signals may be identified. Statistics of the inter-arrival times can be analyzed to identify connection intervals between the master wireless device and the slave wireless device as well as back-to-back interval exchanged within the connection intervals. Packet header contents may be used to reconcile the estimated timing parameters and time slots. Pairings between the master wireless device and the slave wireless device may be identified and tracked along with communication channel parameters.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein enable passive determination of pairing and channel parameters within short-range wireless communications. One or more radio sensors can collect radio signals associated with short-range wireless technologies such as Bluetooth, BLE, Wireless USB, Z-Wave, ZigBee, other personal area network (PAN), or any other wireless communication solutions. It should be appreciated that while certain details and examples presented herein reference short-range wireless protocols, such as Bluetooth, the present inventive technology may be applied to other wireless communication techniques, such as LoRa, long-range IoT, or similar wireless communication modalities without departing from the spirit or scope of this disclosure.

From the radio signals, packet arrival timing and arrival time statistics can be analyzed. The packets make up the data communications between master devices and slave devices. The master and slave devices can exchange data packets at regular intervals, called connection intervals. One or more packets may be exchanged between the master and slave devices within each connection interval. In general, the time between detecting transmitted packets may be referred to as the inter-arrival time (IAT). Specifically, the time between packets may be referred to as the inter-frame space (IFS). The connection interval may, in general, be much greater than the IFS, since several packets may be exchanged within one connection interval.

Statistical analysis of packet arrival times can determine which master and slave devices are paired together and even what their channel parameter settings are. This analysis may be carried out even while detecting packets transmitted from only one side of the conversation (for example, only the master side or only the slave side).

Data from the radio frequency channels can be collected. Timing details can be statistically analyzed (for example, using histograms) to identify candidate interval period and real round-trip time for packet exchanged. Analysis of the extracted parameters can identify connection intervals and determine which pairs of devices participate in the associated time slots. These determinations can support short-range wireless classification and localization.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architecture

Figure 1:
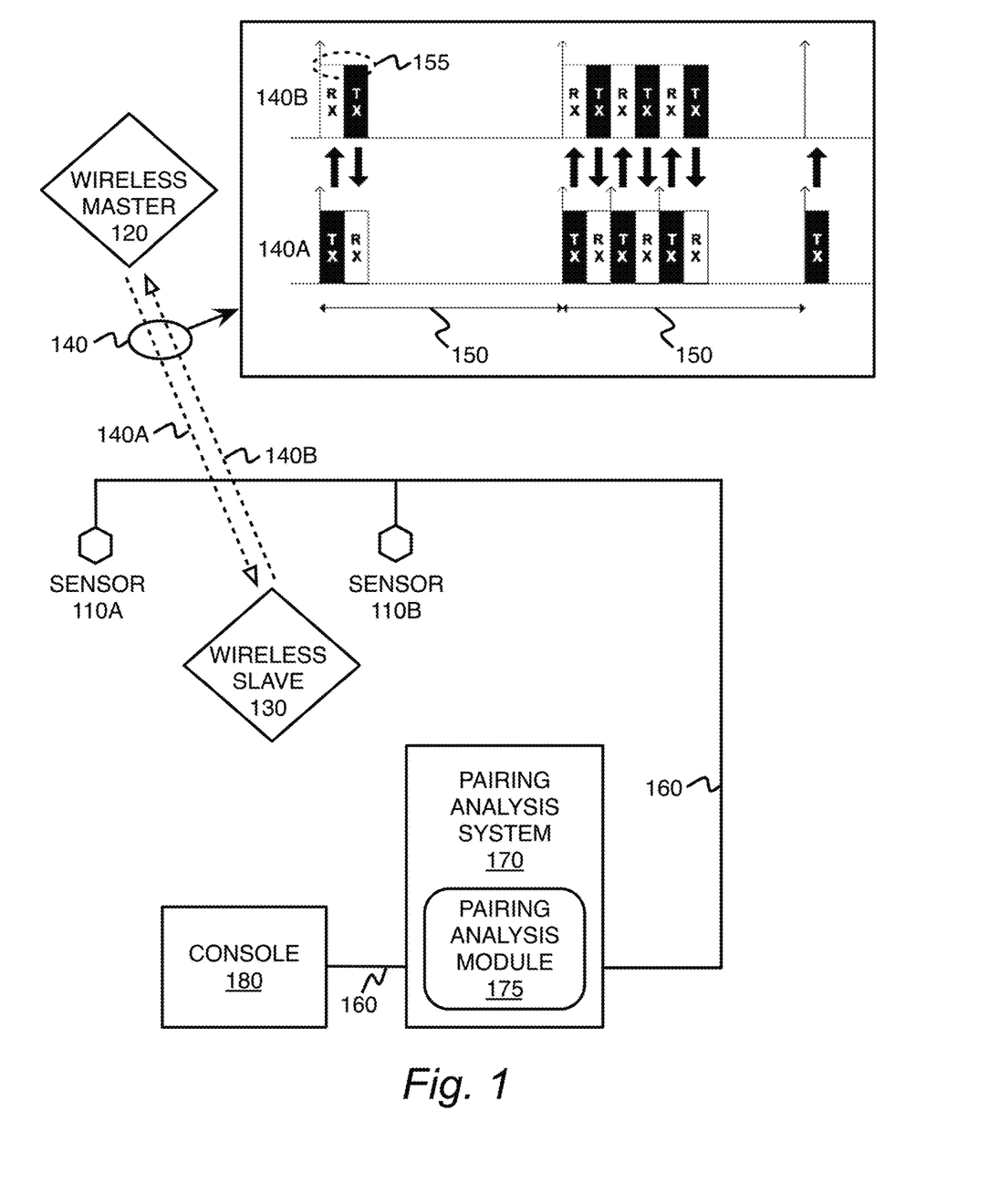
FIG. 1 is a block diagram depicting a sensor analysis system with packet exchange timing in accordance with one or more embodiments presented herein.

FIG. 1 is a block diagram depicting a sensor analysis system with packet exchange timing in accordance with one or more embodiments presented herein. Wireless radio frequency sensors 110A-110B can collect, digest, analyze, and relay radio frequency signals comprising short-range wireless communications 140 between wireless master devices 120 and wireless slave devices 130. The short-range wireless communications 140 can comprise master transmissions 140A from the wireless master device 120 to the wireless slave device 130 as well as slave transmissions 140B from the wireless slave device 130 to the wireless master device 120. The short-range wireless communications 140 can comprise short-range wireless technologies such as Bluetooth, BLE, Wireless USB, Z-Wave, ZigBee, or other personal area network (PAN) solutions.

A wireless master device 120 and a wireless slave devices 130 can connect and exchange data packets at regular connection intervals 150. Within each connection interval 150, the wireless master device 120 and the wireless slave devices 130 may exchange multiple packets. A pair of back-to-back packets can be exchanged within a back-to-back interval 155. The back-to-back interval 155 is smaller than the connection interval 150 since multiple back-to-back packet exchanges can occur within each connection interval 150. For example, the illustrated timing diagram shows an exchange of two packets (one pair of packets) in a first connection interval 150 and then six packets (three pairs of packets) in a second connection interval 150. In an example BLE connection, the connection interval 150 may be between 7.5 milliseconds and four seconds with a step size of 1.25 milliseconds. When there is no data to exchange, zero-byte data packets may be exchanged, which generates the shortest back-to-back packet exchange interval 155.

Examples of wireless master devices 120 may include microcomputers, smartphones, tablets, computers, hot spots, embedded computing devices, wireless infrastructure, or various other computing machines. Examples of the wireless slave device 130 may include any devices wirelessly linked to the wireless master devices 120, such as peripherals, mice, keyboards, printers, mobile devices, speakers, headsets, wearable devices, access control systems, sensors, safety devices, physical security components, access control, HVAC controls, building infrastructure, communication devices, and so forth. One or multiple wireless master devices 120 may communicate with one or multiple wireless slave device 130 in various combinations. For example, using Bluetooth, one wireless master device 120 may generally communicate with up to seven wireless slave devices 130, although far more connections may be parked for future use.

The sensors 110A-110B may be referred to, in general or collectively, as sensors 110 or a sensor 110. The sensors 110 may collect electromagnetic signals from one or more antennas over a wide bandwidth of radio frequencies. The sensors 110 may utilize hardware-defined radio receivers or software-defined radio receivers. According to various embodiments, these radio receivers can convert received radio frequency energy into digital signals. These digital signals can then be decoded into encoded data streams and processed according to various technologies presented herein. The signal data collected by the sensors 110 may be transmitted to the pairing analysis system 170 for processing. These signals or related signal data may be communicated in a continuous fashion or in one or more batches, at particular intervals according to various embodiments.

While hardware-defined radio receivers can be cost-effective and less complex to implement, they may be limited as to what type of encoded data streams they can detect from the electromagnetic environment. For example, a hardware Bluetooth receiver module or chipset is generally not able to also receive Wi-Fi radio signals. In contrast, software-defined radio receivers can much more flexibly receive and decode various data streams within the electromagnetic environment under software control. Software-defined radio receivers can support analyzing wide bands of radio spectrum, which can be useful in short-range wireless technologies such as Bluetooth, where pseudorandom hopping over 79 channels can make the monitoring of radio channels quite a challenge. Similarly, software-defined radio receivers can support a diverse variety of data rates, modulation schemes, and control protocols that may be used in short-range wireless technologies such as Bluetooth.

The pairing analysis system 170 can receive and process signals from the sensors 110. One or more pairing analysis modules 175 may support operation of the pairing analysis system 170. The pairing analysis system 170 may perform, among other functions, receiving packets, aggregating packets, associating packets, master/slave identification, determining packet lengths, calculating aggregated data transfer for a wireless connection, evaluating packet utilization for a wireless connection, classifying wireless connection types, assessing threat characteristics for a wireless connection, characterization of wireless device users, localization of wireless devices, and various other types of signal processing and analysis.

The console 180 and various associated operator interfaces can support configuring, controlling, or reviewing analysis results associated with the pairing analysis system 170. The console 180 can provide visualization features for use by system or security administrators to monitor the electromagnetic environment for wireless security usage and security threats. Such visualizations may include displays about the area under observation, including device type, device position, estimates of the data throughput being transmitted by devices, attack types being perpetrated, victim devices, and so forth. The operator interfaces may comprise interfaces associated with one or more visualization consoles 180, one or more administrative user interface applications, or various other user or system interfaces associated with the technology presented herein.

The console 180 can provide a user interface for security personnel or system administrators to obtain visibility into operations of the pairing analysis system 170 and determinations about the various wireless master device 120 and wireless slave device 130 engaging in short-range wireless communications 140 based upon analysis of the electromagnetic environment. The pairing analysis system 170 may localize, monitor, record, and playback the position and activity of the various short-range wireless devices 120, 130, including suspected rogue, unauthorized, or malicious devices. A system administrator, or other user, may use the console 180 to discover, localize, and otherwise analyze a malicious short-range wireless devices 120, 130 operating within an enterprise or other facility. The administrator may be provided with a visualization of the position of the short-range wireless devices 120, 130 in the environment.

The visualization may include metadata for each of the short-range wireless devices 120, 130. For each given short-range wireless devices 120, 130, the metadata may include physical layer specifications such as modulation, protocols, master/slave status, traffic classification, symbol rates, bandwidths, or frequencies; a likelihood metric that the device is rogue, unauthorized, or malicious; a type of attack, if any, being employed by the device; and other short-range wireless devices 120, 130 that the particular device is likely to be communicating with.

The networks 160 may interconnect some or all of the sensors 110, the pairing analysis system 170, and the console 180. Portions of the networks 160 connecting the sensors 110 may be configured to transmit radio frequency signals and/or digital information. Radio frequency signals may be communicated as collected, down-converted using an intermediate frequency oscillator, or down-converted to baseband. Communication links associated with the networks 160 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 160 may use wireless frequencies or transmission paths that are selected to avoid interference from or to the electromagnetic environment in use by the short-range wireless devices 120, 130.

The pairing analysis system 170 can support passive determination of pairing and channel parameters within the short-range wireless communications 140. The pairing analysis system 170 can receive short-range wireless radio frequency signals and use the signals to analyze packet arrival timing and arrival time statistics. For example, the pairing analysis system 170 can histogram back-to-back interval 155 to compute a candidate inter-arrival time. By expanding the back-to-back time scale, the pairing analysis system 170 can identify connection interval 150. A histogram analysis of connection intervals 150 may be used to identify packet exchange time slots. The time slots can be reconciled with packet header details in order to fully characterize pairings and connection parameters within the short-range wireless communications 140. The wireless connections and their pairing can be tracked over time, and operations of the pairing analysis system 170 can support short-range wireless classification and localization.

Tracking can detect when connection parameters are changed. The detection and analysis may then be restarted to mitigate tracking loss. In such instances, one or more packets may not be received (out of range, below noise floor, etc.), or packets may be encrypted.

Tracking and analysis may provide information on connection interval anomalies. For example, the pairing analysis system 170 can determine when certain connections may not use the typical connection interval 150 in multiples of 1.25 millisecond steps.

Packet length may be used to adjust offset in back-to-back interval 155 in packets with more than zero data length. This adjustment may help to ensure that frame arrivals still fall within an expected time slot.

The pairing analysis system 170 can adjust back-to-back intervals 155 and connection interval 150 in a tracking loop for long-lived connections. This adjustment can help to correct for clock drift.

The pairing analysis system 170 can maintain timing heuristics (such as known back-to-back intervals 155 and/or connection intervals 150) to reduce start-up latency.

The pairing analysis system 170 can establish and maintain tracking in frequency hopping scenarios.

The pairing analysis system 170 can leverage multiple sensors as both halves of an operating frequency band to decode connection requests and seed localization sensors with connection parameters.

Figure 5:
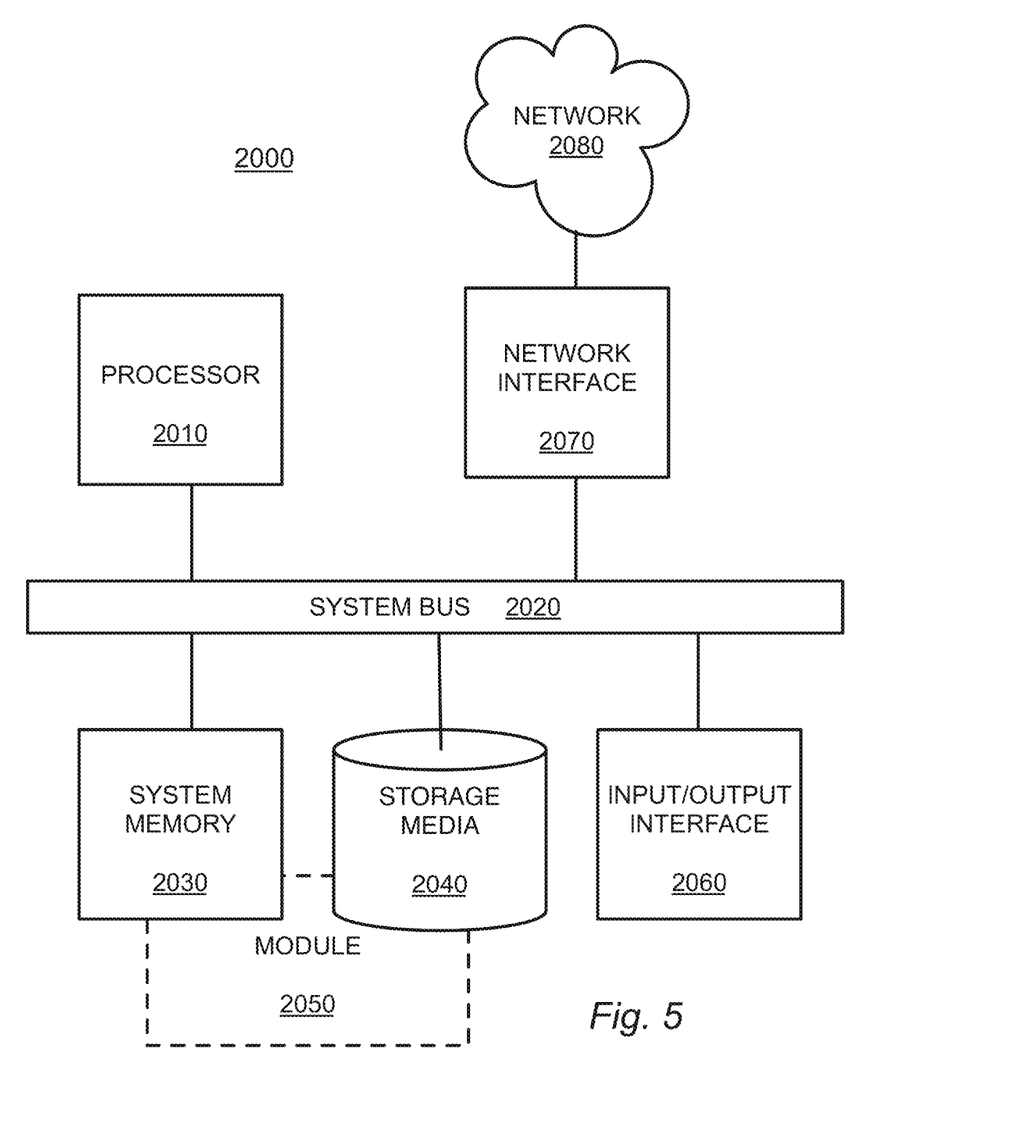
FIG. 5 is a block diagram depicting a computing machine and a module in accordance with one or more embodiments presented herein.

The wireless master devices 120, wireless slave devices 130, sensors 110, pairing analysis system 170, console 180, or any other systems associated with the technology presented herein may be any type of computing machine such as, but not limited to, those discussed in more detail with respect to FIG. 5. Furthermore, any modules associated with any of these computing machines, such as the pairing analysis module 175, or any other modules (scripts, web content, software, firmware, or hardware) associated with the technology presented herein may be any of the modules discussed in more detail with respect to FIG. 5. The devices and computing machines discussed herein may communicate with one another as well as other computer machines or communication systems over one or more networks, such as network 160. The network 160 may include any type of data or communications links or network technology, including any of the network technologies discussed with respect to FIG. 5.

Figure 2:
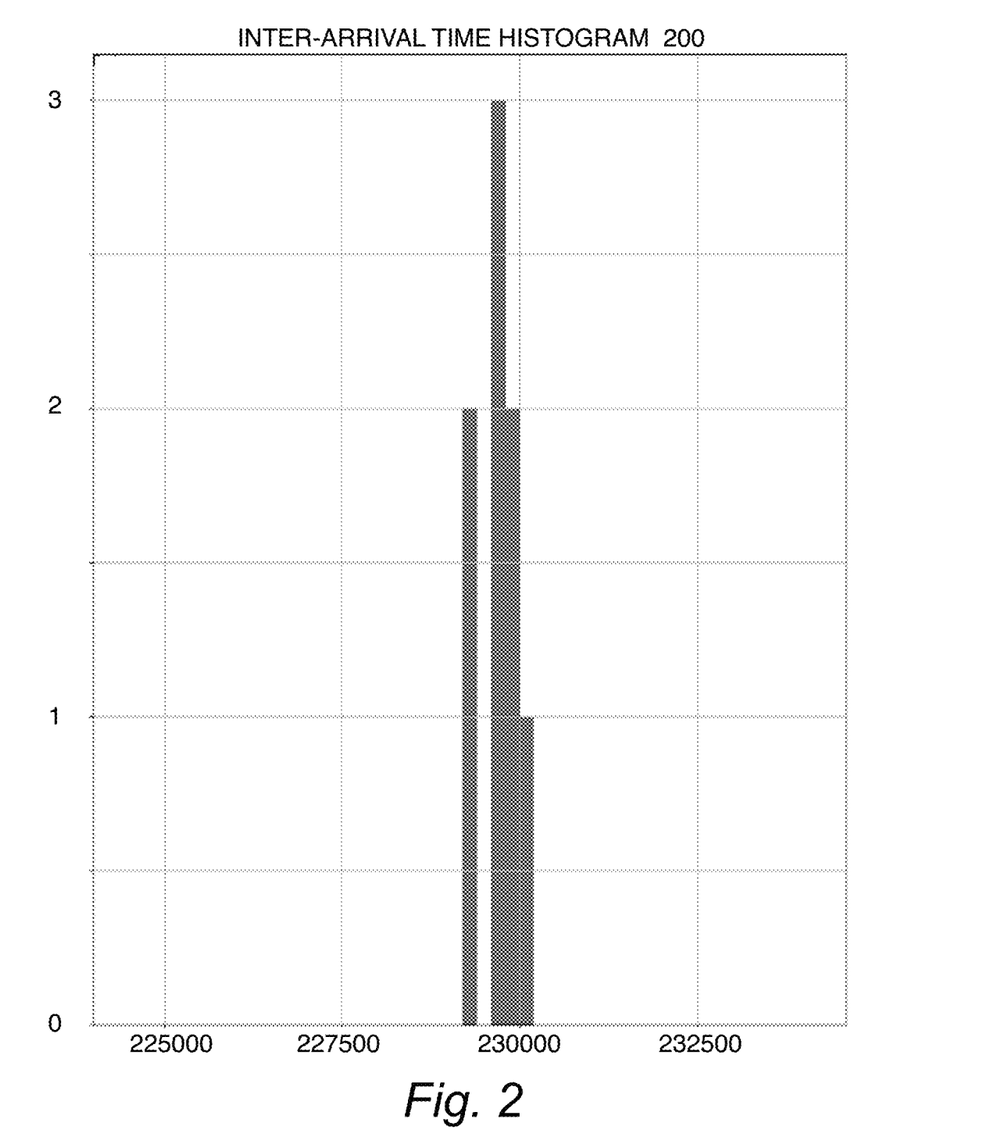
FIG. 2 is a histogram plot illustrating short-range wireless packet inter-arrival time statistics in accordance with one or more embodiments presented herein.

FIG. 2 is a histogram plot 200 illustrating short-range wireless packet inter-arrival time statistics in accordance with one or more embodiments presented herein. The horizontal axis shows packet inter-arrival time bins in nanoseconds. The vertical axis shows quantities of analyzed packets falling into each histogram bin. Back-to-back inter-arrival times can be analyzed from such a histogram. The sharpness of the histogram illustrates how the inter-arrival times are fairly consistent. However, close analysis can identify some variation in the inter-arrival times.

Figure 3:
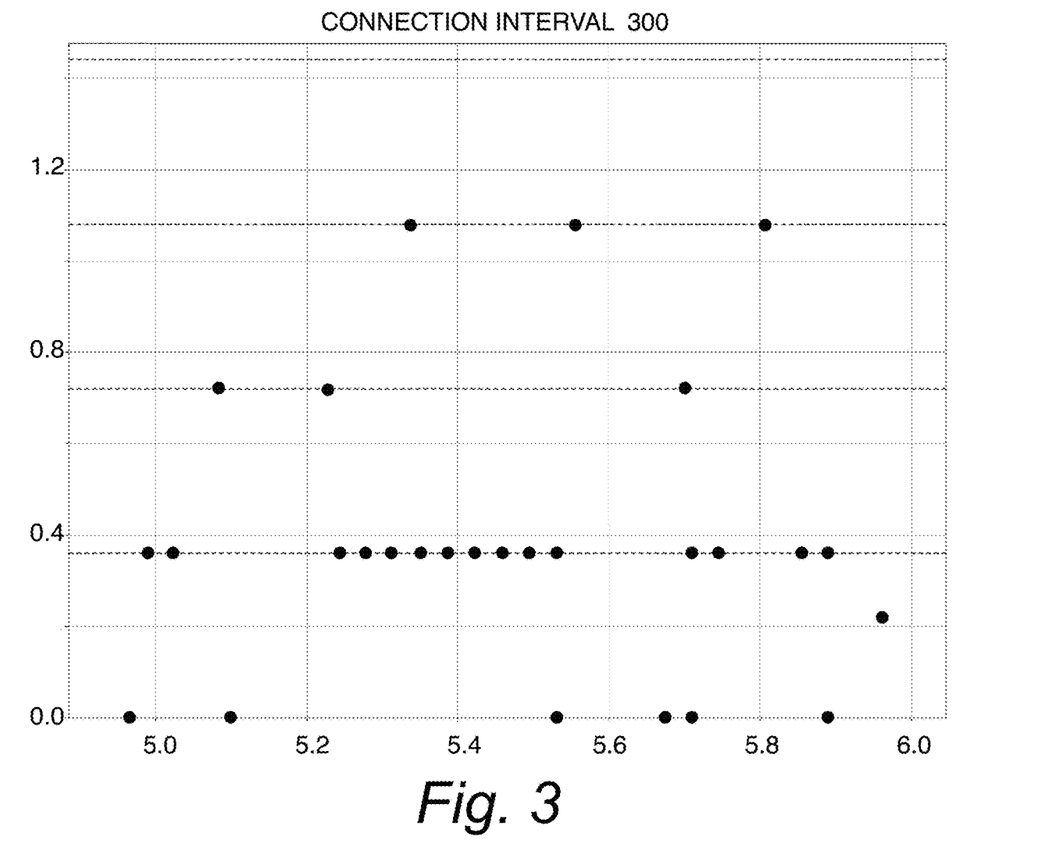
FIG. 3 is a time series plot illustrating short-range wireless packet arrival times in accordance with one or more embodiments presented herein.

FIG. 3 is a time series plot illustrating short-range wireless packet arrival times in accordance with one or more embodiments presented herein. The horizontal axis shows time in seconds. The vertical axis shows inter-arrival time in seconds. From the horizontal groupings, back-to-back connection intervals 155 can be identified.

Example Processes

According to methods and blocks described in the embodiments presented herein and in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 4:
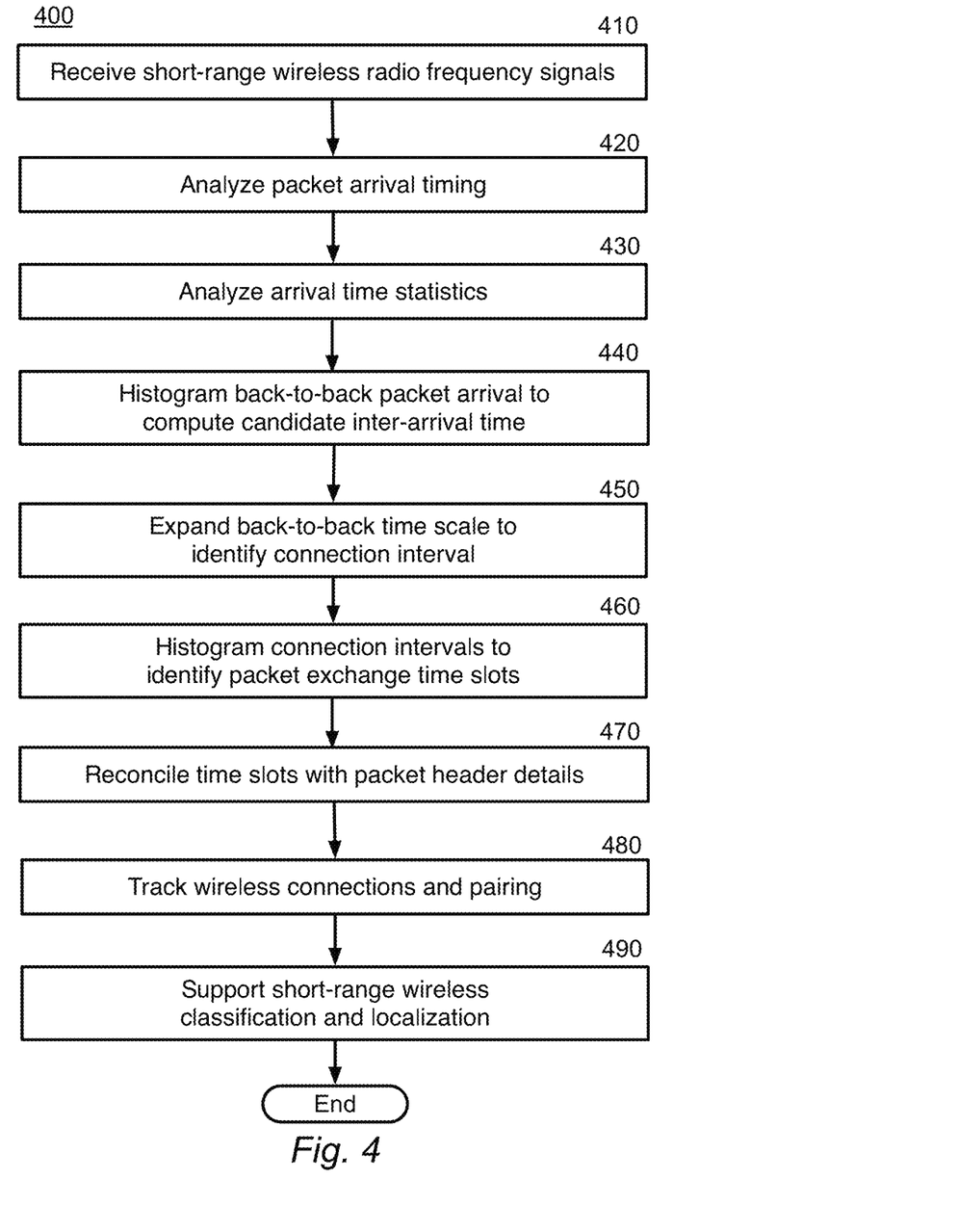
FIG. 4 is a block flow diagram depicting a method for passive determination of pairing and channel parameters within short-range wireless communications in accordance with one or more embodiments presented herein.

FIG. 4 is a block flow diagram depicting a method 400 for passive determination of pairing and channel parameters within short-range wireless communications in accordance with one or more embodiments presented herein. In block 410, one or more radio frequency sensors 110 may collect radio frequency signals associated with short-range wireless communications 140. While the techniques presented herein may be applied to signals collected by one radio frequency sensor 110, multiple spatially distributed sensors 110 can improve results. Enough radio frequency data can be collected for analysis. For example, N frames or M seconds worth may be specified as a minimum collection.

Frames may be captured specifically within channels that are in a desired passband. For example, signals outside the passband may be from strong frame signals that are aliased within the channelizer associated with the sensor 110, and these may be disregarded.

Data with outlier timestamps may be dropped. For example, erroneous frames may be assigned a zero or negative inter-arrival time. Similarly, the inter-arrival time may appear too small to be valid given within the protocol specification and/or its PHY/MAC parameters. These frames may be dropped to avoid corrupting statistical analysis of frame timing.

In certain example protocols, such as BLE, devices may initially use an advertising channel until a connection is established. Collecting signals from advertising channels can inform connection pairings as they are created. Otherwise, blind analysis may be used to identify pairings. For example, in BLE, connections can use a randomly generated access address once pairing is established, and the access address can be difficult to follow without having seen the initial connection request. However, the access address can be identified by examining empty packets. Empty packets have a predictable form, and the CRC can be reversed from the empty packet.

In block 420, the collected signals can be examined to analyze packet arrival timing. The connection interval 150 can be established between the wireless master device 120 and the wireless slave device 130 at the connection setup.

At a given connection interval 150, the wireless devices 120, 130 may swap messages as pairs. During the message pair exchange, the wireless master device 120 can transmit first, and then the wireless slave device 130 can transmit second. Observing the exchange in the acquired radio signals, it can be verified that the back-to-back interval 155 between the wireless master device 120 and the wireless slave device 130 is less than the specified maximum round-trip period. In certain BLE examples, the round-trip period may be 300 microseconds.

If the time before a subsequent packet exceeds the minimum idle period, it may be established that a new connection is beginning and the inter-arrival time in question is approximately a connection period 150 and not the smaller back-to-back interval 155. In certain examples, such as BLE, the minimum idle period may be approximately ten milliseconds.

This analysis may be limited to situations where both sides of the communication can be sampled to obtain signals transmitted by both the wireless master device 120 as well as the wireless slave device 130. It may also be necessary to know (or be able to guess) ranges of packet timing parameters. Unfortunately, BLE and similar example protocols may be able to set the packet timing parameters to arbitrary values. In certain embodiments, packet timing parameters may be dynamically renegotiated at runtime.

In block 430, the collected signals can be examined to analyze packet arrival time statistics in further detail. For example, back-to-back interval 155 statistics may be narrowed down within connection intervals 150. Such broader statistical approach can be leveraged to overcome limitations of a first-level timing analysis approach, such as discussed with respect to block 420. For example, this more involved statistical analysis can evaluate connections when only one side of the exchange is captured or when timing parameters are unknown.

Connections can be tracked based on their access addresses. Timing between packet events can be collected and statistically analyzed. Regular repeating intervals can be identified. These may be the smaller "round trip" packet time of a back-to-back interval 155 as well as the longer time-scale connection interval 150. Statistically accumulated connection intervals 150 may be measured as being shorter than the actual period since they may contain one or more back-to-back intervals 155 within the spacing.

In certain BLE examples, the back-to-back interval 155 may be 150 microseconds resulting in a round-trip period of 300 microseconds. When a minimum connection interval 150 may be 1.25 milliseconds, the analysis can limit consideration to event intervals less than one millisecond to ignore connection interval 150 events and thus evaluate only back-to-back interval 155 event statistics.

In block 440, statistical distribution of back-to-back packet arrival events can be evaluated to compute a candidate inter-arrival time. For example, histogram analysis of back-to-back packet arrival events may be performed. A central peak identified within the histogram analysis may show that the inter-arrival events are quite fairly consistent but with some small range of variation. The average of those variations around the peak may be used as a candidate average back-to-back interval 155.

In block 450, expanding the time scale of the back-to-back packet arrivals can allow patterns to identify a connection interval 150. As discussed in associated with FIG. 3, time series analysis of short-range wireless packet arrival times can reveal horizontal groupings of connection intervals 150 comprising one or more shorter back-to-back intervals 155.

In block 460, connection intervals can be analyzed to identify packet exchange time slots. Histogram analysis of inter-arrival times greater than one millisecond (likely connection intervals 150) can reveal variations introduced by packet loss at multiples of the back-to-back interval 155.

Time slots can be calculated from the determined connection parameters. Observing multiple of the connection intervals 150, the time series can be zoomed in to show multiples of the back-to-back intervals 155 around each multiple of connection intervals 150.

Frames inter-arrival times can be matched into slots regardless of connection interval 150. From the time slots, it may be possible to track packet loss and determine which of the wireless master device 120 or the wireless slave device 130 is transmitting.

The calculated connection interval 150 candidates may be verified, or at least refined, based upon this histogram analysis. The true connection interval 150 may be determined from the largest slot offset. In scenarios of high packet loss, the slot may be multiples of the true connection interval 150. If the link quality is excellent, the slot may be the true connection interval 150 minus one back-to-back interval 155 for instances where no data is exchanged.

From estimating which slot a future packet falls into, it may be determined whether the packet is in an even or odd slot, and thus, guess if the packet was transmitted by the wireless master device 120 or the wireless slave device 130.

Agreement between the longest (modulo reduced) connection interval 150 and the shortest may be verified to confirm the true connection interval 150.

In block 470, time slots may be reconciled with packet header details. Flags within the packet headers, such as sequence number, expected sequence number, more data flag, etc., can be examined. These flags can indicate if the packets are in sequence. The sequence can validate the classification of each transmitter as wireless master device 120 or the wireless slave device 130.

In block 480, wireless connections and pairings can be tracked over time. Computed statistics can determine whether a successful track is established and maintained.

Tracking all packets of a locked-on connection can verify connection parameters and pairings between a wireless master device 120 and a wireless slave device 130. If tracking lock is lost, the analysis may return to an earlier block.

In block 490, classification of short-range wireless connections may be supported. The classification may include localization of the wireless master device 120 and/or the wireless slave device 130. Collecting, classifying, and verifying exchanged packets within the radio frequency signals collected by the one or more sensors 110 can aid in identifying the operation of the wireless master device 120 and/or the wireless slave device 130 as well as establishing their locations. Computing such additional information can significantly improve communication security within the associated enterprise or campus.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general-purpose processor, a processor core, a multiprocessor, a reconfigurable processor, a microcontroller, a digital signal processor ("DSP"), an application-specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010, along with other components of the computing machine 2000, may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs, and program modules such as module 2050, data, or any other information. The storage media 2040 may be part of, or connected to, the computing machine 2000. The storage media 2040 may also be part of one or more other computing machines that are in communication with the computing machine 2000, such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may, therefore, represent examples of machine or computer-readable media on which instructions or code may be stored for execution by the processor 2010. Machine or computer-readable media may generally refer to any medium or media used to provide instructions to the processor 2010. Such machine or computer-readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices, may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000 or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices, including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices, including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used so that personally identifiable information is removed. For example, a user's identity may be treated so that no personally identifiable information can be determined for the user, or a user's geographic location may be generalized where location information is obtained (such as to a city, ZIP code, or state level) so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated descriptions in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer, as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method comprising:
    positioning one or more radio frequency sensors within an electromagnetic environment where a master wireless device and a slave wireless device share a wireless communication interface;
    receiving, at the one or more radio frequency sensors, signals transmitted between the master wireless device and the slave wireless device over a wireless connection;
    identifying inter-arrival times for packets within the received signals;
    estimating communication time slots from identified back-to-back intervals that occur within connection intervals of the packets; and
    identifying packets within the wireless connection as being transmitted by the master wireless device or the slave wireless device.

2. The method of claim 1, wherein the wireless connection is associated with one of a Bluetooth interface, wireless USB interface, a ZigBee interface, and a personal area network interface.

3. The method of claim 1, wherein analyzing statistics of the inter-arrival times comprises histogram analysis.

4. The method of claim 1, further comprising classifying pairings between the master wireless device and the slave wireless device.

5. The method of claim 1, further comprising geo-locating one of the master wireless device and the slave wireless device.

6. The method of claim 1, further comprising identifying security threats associated with the wireless connection.

7. The method of claim 1, wherein data payload associated with the wireless connection remains encrypted.

8. The method of claim 1, wherein classifying one or more security threats is carried out without decrypting encrypted data payloads associated with the wireless connection.

9. The method of claim 1, wherein receiving signals comprises leveraging software-defined radio to support various communication channel parameters.

10. The method of claim 1, further comprising:
    analyzing statistics of the inter-arrival times to identify connection intervals between the master wireless device and the slave wireless device; and
    tracking the wireless connection between the master wireless device and the slave wireless device.

11. A system comprising:
    one or more sensor antennas;
    one or more radio frequency sensors configured to receive signals over a wireless connection associated with a wireless communication interface between a master wireless device and a slave wireless device; and
    a signal analysis system comprising a processor configured to:
        identify inter-arrival times for packets within the received signals;
        estimate communication time slots from identified back-to-back intervals that occur within connection intervals of the packets;
        identify pairings between the master wireless device and the slave wireless device within the wireless connection; and
        present identified pairings to an operator console.

12. The system of claim 11, wherein the wireless communication interface comprises a Bluetooth low-energy interface.

13. The system of claim 11, wherein the wireless communication interface is one of a wireless USB interface, a ZigBee interface, and a personal area network interface.

14. The system of claim 11, wherein analyzing statistics of the inter-arrival times comprises histogram analysis.

15. The system of claim 11, wherein the processor is further configured to classify channel timing parameters between the master wireless device and the slave wireless device.

16. The system of claim 11, wherein the processor is further configured to geo-locate one of the master wireless device and the slave wireless device.

17. The system of claim 11, wherein data payload associated with the wireless connection remains encrypted.

18. The system of claim 11, wherein classifying one or more security threats is carried out without decrypting encrypted data payloads associated with the wireless connection.

19. The system of claim 11, wherein the one or more radio frequency sensors comprise software-defined radio receivers operable to support a variety of communication parameters.

20. A non-transitory computer-readable medium storing computer-executable instructions that, when executed by at least one processor, cause the at least one processor to perform operations of:
    positioning one or more radio frequency sensors within an electromagnetic environment where a master wireless device and a slave wireless device share a wireless communication interface;
    receiving, at the one or more radio frequency sensors, signals transmitted between the master wireless device and the slave wireless device over a wireless connection;
    identifying inter-arrival times for packets within the received signals;
    estimating communication time slots from identified back-to-back intervals that occur within connection intervals of the packets; and
    identifying packets within the wireless connection as being transmitted by the master wireless device or the slave wireless device.

* * * * *